INVENTORS
James O. Harris
Raleigh W. Wise
BY
Richard O. Zerbe
AGENT

United States Patent Office 3,531,996
Patented Oct. 6, 1970

3,531,996
CURE SIMULATOR
James Olin Harris and Raleigh Warren Wise, Akron, Ohio, assignors to Monsanto Company, St. Louis, Mo. a corporation of Delaware
Filed Oct. 23, 1968, Ser. No. 770,005
Int. Cl. G01n 25/02, 3/32
U.S. Cl. 73—432
20 Claims

ABSTRACT OF THE DISCLOSURE

A process for measuring the progress of cure of an elastomer under non-isothermal conditions such as exist when a thick section of rubber is vulcanized, in which an elastomer sample is subjected to temperature as a function of time similar to that of a section of a rubber article during cure while measuring a property which is a function of the time-temperature relationship such as relative viscosity, thereby providing a viscosity-versus-time relationship of the non-isothermally treated elastomer.

---

Cure meters have been developed which determine curing characteristics under isothermal conditions or variable temperatures related to some standard function; whereas, in actual practice, the temperature of each section of a rubber article is constantly changing during the curing cycle by a unique temperature-time relationship. This unique variation particularly applies to thick rubber articles such as tires where the insulating properties of the rubber result in widely divergent temperatures between the different sections of the article during the cure cycle. Curing data are especially critical in such cases where compounds having different curing characteristics are combined in a single article.

An object of this invention is to provide a metal die system, the temperature of which can be changed rapidly and uniformly. A further object of this invention in one embodiment thereof is to provide a die system comprising two members, each composed of one or more parts, with each member having a relatively small mass and containing or having attached thereto a heater, preferably an electrical heater. A further object of this invention is to provide a metal die system having a cavity which provides a thin cross section of rubber to eliminate large temperature differentials which result across thick rubber sections. A further object of this invention is to provide a metal die system, the temperature of which can be controlled with reference to time to be equal to the temperature at any given time as measured in a thick section of rubber being cured. A further object of this invention is to provide a metal die system, the temperature of which can be controlled to provide a temperature-time relationship similar to that previously determined for a rubber article during cure. A further object of this invention is to provide a metal die system for determining curing characteristics data without prior knowledge of or making assumptions of or experimentally determining values of the activation energies of vulcanization reactions.

In accordance with this invention, the method of testing rubber comprises determining the temperature-time relationship of a section of a rubber article during cure and subjecting a sample of rubber to a similar temperature-time relationship while measuring a property which is a function of the temperature-time relationship, preferably the viscosity thereof but another suitable property, for example, pressure exerted by the rubber confined in a pressure chamber may be measured. In a more complex embodiment of the invention, different sections of the same rubber article composed of different rubber blends are tested in the aforesaid manner. If desired, the cure-meter may be controlled by a previously determined temperature-time relationship for a section of rubber during cure. This feature is particularly applicable for testing a series of compounds under identical non-isothermal conditions.

Figure 5:
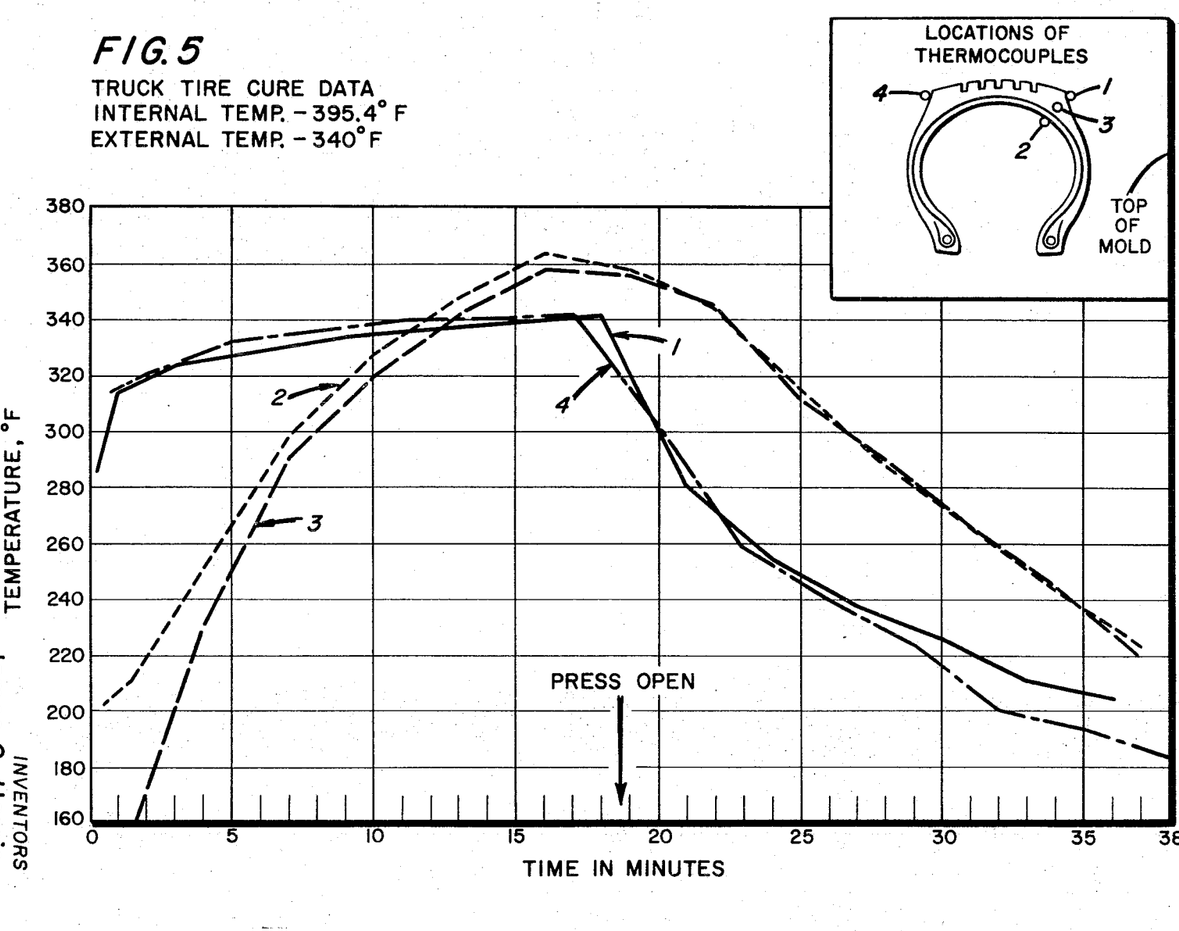
FIG. 5 is a plot of temperature as a function of time as measured with four thermocouples placed at different positions in the body of a truck tire during vulcanization.
Figure 6:
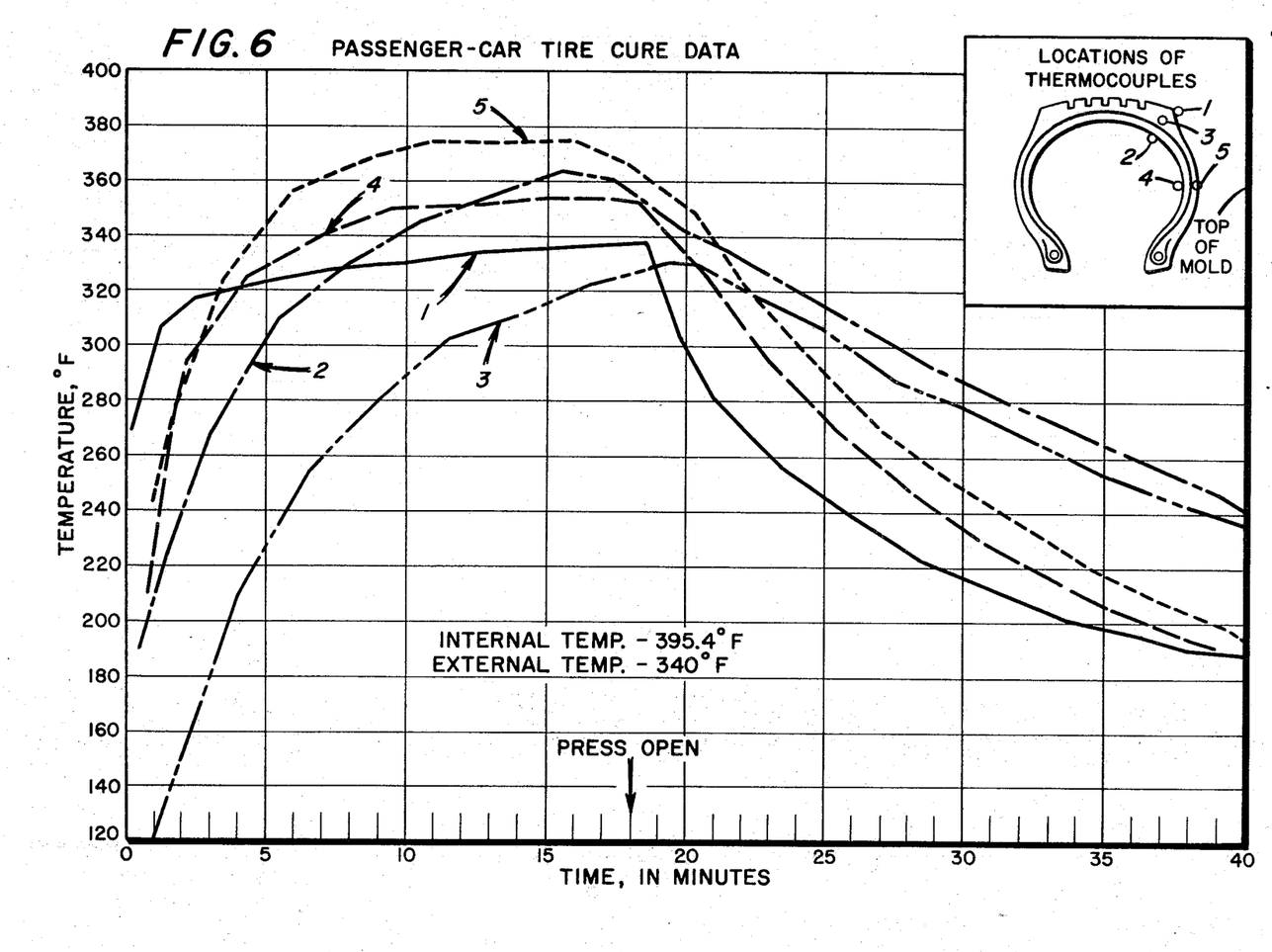
FIG. 6 is a similar plot of temperature as a function of time as measured with five thermocouples placed as indicated in the body of a passenger-car tire during vulcanization.

The problem of determining optimum curing conditions for thick rubber sections is related to the poor thermal conductivity of the rubber. Mold temperatures which are adequate to give reasonable cure times for thick cross sections of rubber usually result in overcure for rubber adjacent to the mold and undercure for the rubber farthest from the mold. This is somewhat compensated for by the fact that rubber in the center of the article cools slower than that on the outside of the article and curing continues longer after the article is removed from the mold. Such post curing, after pressure is reduced when the mold is opened, can possibly lead to poor quality material. The problem is further complicated in the curing of articles such as tires which contain more than one rubber compound which cure at different rates. FIG. 5 illustrates the large variations which exist in the temperature-time history for rubber at the two edges of the tread material, thermocouples 1 and 4, as compared to rubber stock on the inside of the tire, thermocouple 2, and to the rubber at a point between the tread material and the carcass of the tire, thermocouple 3. It is questionable whether stock close to the reinforcing plys as subjected to the temperature-time profile of thermocouple 3 reaches the same state of cure as the tread stock on the outside of the tire, as subjected to the temperaure-time profile of thermocouple 1 or 4. FIG. 6 shows five different temperature-time profiles within a passenger-car sized tire. The temperature profiles shown in FIGS. 5 and 6 show in all cases that the sections which are slowest to heat are also the sections which are the slowest to cool after the press is opened.

A major problem exists in the selection of curing conditions to eliminate both overcure and undercure throughout all parts during the vulcanization of thick articles. The investigation of several different sections by the method of this invention may lead to the discovery of irreconcilable differences in cure properties so that no acceptable cure time exists. By the time the slowest curing section is adequately cured, other sections may be unacceptably overcured. The solution of the problem will require compounding variations which will be greatly aided by the present invention. The invention is useful both to discover unsuspected problems and to solve them. Where the various stocks making up a complex rubber article are properly compound so that a satisfactory optimum cure exists, the optimum cure can be determined by examination of the various sections in the manner described.

Figure 1:
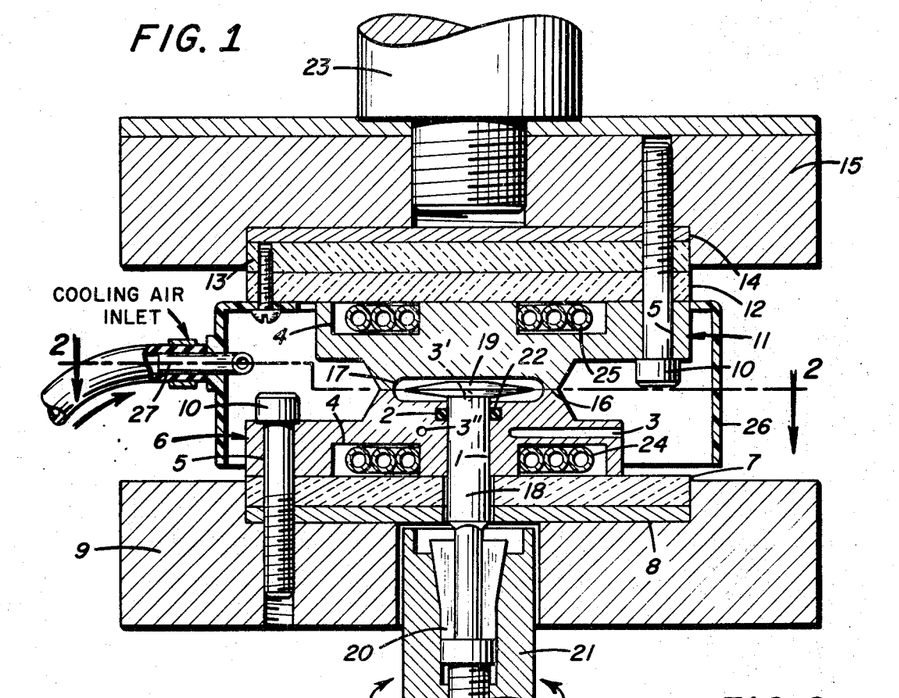
FIG. 1 is a vertical cross section, taken along line 1—1 of FIG. 2, showing the two metal dies with supporting insulators and steel back-up plates and with an oscillating rotor in the test cavity as installed in the platens of a rheometer.
Figure 3:
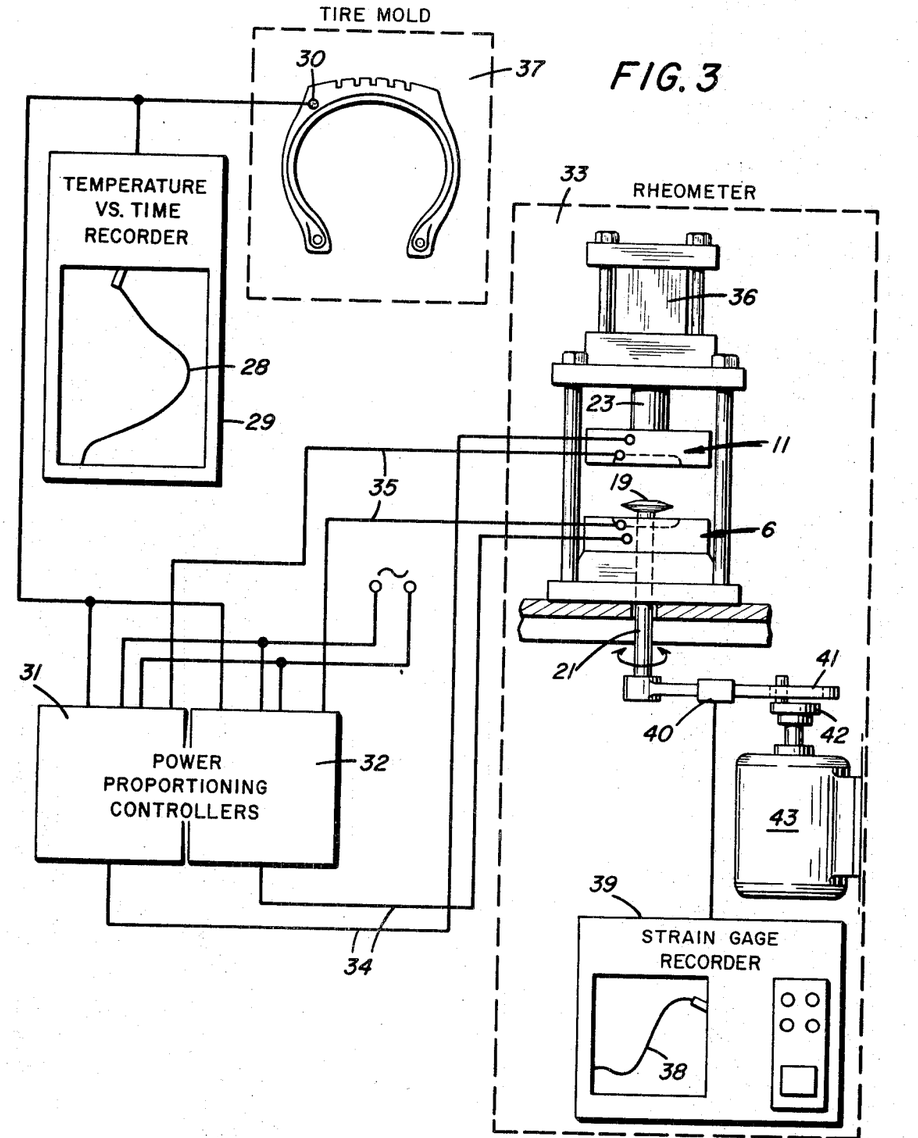
FIG. 3 is a schematic view showing the recording of the temperature as a function of time at a specific point in a thick section of rubber within a mold or specifically at a point in a tire within a mold during vulcanization and the controlling of the temperature of the rheometer dies at this measured temperature.

FIG. 1 illustrates a cross section of the die apparatus as installed in a rheometer with a rotor in place in the test cavity. The lower die member 6, together with the heat-insulating plate 7 and the steel back-up plate 8, are fastened to the lower platen 9 with three screws only one of which 10 is shown in the cross section through the hole 5. The upper die member 11, together with heat-insulating plates 12 and 13, and the steel back-up plate 14 are bolted to the upper platen 15 in a similar manner. The lower die member 6 and upper die member 11 contact each other at 16 to form the die cavity 17. The shaft 18 of the rotor 19 extends through the hole 1 in the lower die 6 and is held securely by the collet 20 in the torque shaft 21 of the rheometer. The O-ring 22 located in the groove 2 in the lower die 6 serves to seal the cavity 17. The cavity 17 is preferably sized such that the rubber cross sections are not more than 0.100 inch. Relatively thin cross sections are desirable to minimize thermal gradients which arise because of the poor heat transfer across rubber but rubber cross sections up to 0.2 inch are feasible. The ram 23 from the air cylinder 36, shown in FIG. 3, provides the necessary force to maintain pressure on the die members during the experiments. Ring heaters 24 and 25 provide heat to raise the temperatures of the dies. The shield 26 fixed to the insulator 12 and extending close to the lower platen 9 shields the dies from external drafts. The air fitting 27 is used to circulate a cooling air stream within the shield 26 if rapid cooling is required during the cooling portion of the temperature-time cycle.

Figure 2:
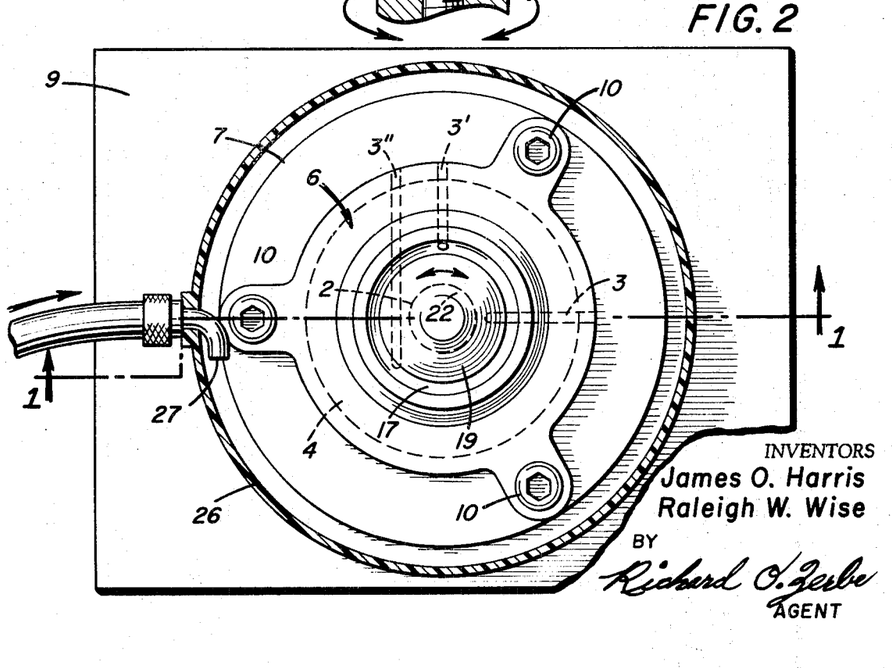
FIG. 2 is a plan view of the metal lower die member, taken along line 2—2 of FIG. 1, with the heater cavity, thermocouple wells, and O-ring groove, below the surface of the die, indicated by phantom lines.

FIG. 2 is a plan view of the lower die member 6 illustrating the reduction of mass by the elimination of excess metal from the die. The flanges through which screws 10 pass secure the die firmly in place, but the intervening metal has been eliminated. Small mass is a prerequisite for making the rapid controlled temperature changes desired. The hole 1 for the rotor shaft and the O-ring groove 2, shown in dash lines, are in the lower die only. Also shown in dash lines are the die heat control thermocouple well 3, the sample thermocouple well 3', a spare thermocouple well 3'', and the groove for the ring heater 4. Three holes 5 are provided for mounting screws 10. The heat-insulating plate 7 between the die 6 and the platen 9 serves to inhibit heat loss from the die and aids in keeping the test material in the test cavity 17 at the proper temperature while being subjected to stress by the rotor 19. The O-ring 22 seals the cavity at the opening for the rotor. The thermocouple well 3 is located as close as practical to the heater groove 4 to provide rapid response in the control loop. The depth of the heater groove 4 is determined by the thickness of the type of heater used. The groove may be eliminated when flat foil heaters are used. The upper die member is identical to the lower die member except for the elimination of the rotor shaft hole 1, the O-ring groove 2, and the reorientation of the thermocouple wells 3, 3', and 3''.

FIG. 3 shows a specific embodiment of the invention in a block diagram. It comprises the recording 28 on a recorder 29 (optional) of temperature as a function of time as measured at a particular point 30 in a rubber article during vulcanization. A signal proportional to the temperature is transmitted to power proportioning controllers 31 and 32 used to control the temperatures of the lower die 6 and the upper die 11 of a modified Monsanto Oscillating Disk Rheometer 33. Power leads 34 from the temperature controllers 31 and 32 connect the heaters in the lower die 6 and the upper die 11. Thermocouple lead wires 35 from thermocouples located in the two die members carry the temperature feed-back signal from each die to its respective temperature controller to complete the control loop. A sample of rubber for tests is placed in the die cavity 17 and the cavity is closed by the ram 23 from the air cylinder 36. The temperature of the dies is varied by the controllers 31 and 32 to match the temperature sensed by the thermocouple at 30 of the article being cured in the mold 37. For convenience, a record of the temperature 28 as a function of time is recorded by the recorder 29 but the presence of a recorder is optional. Obviously, when a temperature recorder is present the set points for the temperature controllers may be continuously provided by the temperature recorder instead of directly by the sensor if desired. The relative viscosity which is proportional to the torque is recorded at 38 by the strain-gauge recorder 39, utilizing the strain-gauge bridge 40. The strain gauges are fixed to the torque arm 41 which is fastened to the torque shaft 21 and which is oscillated sinusoidally by the eccentric 42 which is attached to the shaft of the motor 43. The oscillation of the rotor may be any convenient frequency, usually within the range of 1 to 1000 cycles per minute.

Figure 4:
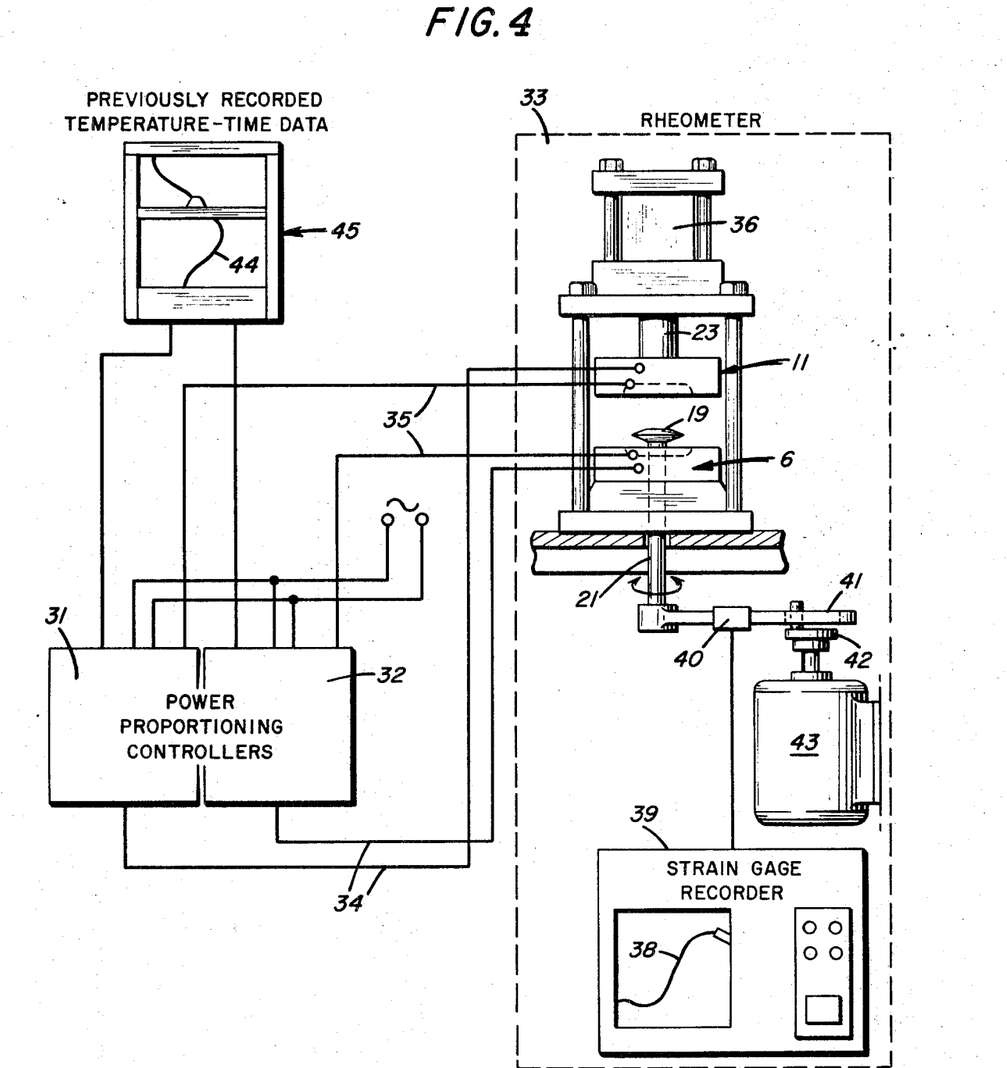
FIG. 4 is a schematic view showing the incorporation of a curve follower using previously recorded temperature-time data taken during the curing of thick rubber sections to control the temperature of the rheometer dies when making experiments in sample viscosity.

FIG. 4 illustrates another embodiment of the invention in which the temperature of the dies is controlled according to a previously recorded temperature-time relationship. The temperature as a function of time is transcribed on the control card 44 of a curve follower 45. The set points for the temperature controllers 31 and 32 for the lower and upper die members are continuously provided by the curve follower 45. The remainder of the apparatus could remain the same as that described in FIG. 3. In one specific mode of operation, the temperature-time relationship of a section of a rubber article during cure is incorporated into a Research, Inc. Model 5300 curve follower driving a pair of Research, Inc. Model MPRY power proportionating temperature controllers for the dies of a modified Monsanto Oscillating Disk Rheometer containing 250-watt ring heaters in the bottom of each die.

FIG. 5 is a temperature-time plot of data obtained during a cure check on truck-sized tires cured for 18.7 minutes and post inflated. The locations of the thermocouples used to obtain the data were as follows: (1) Outside, top; (2) inside, between bladder and carcass shoulder; (3) top, inside shoulder between tread and carcass; (4) outside, bottom. The internal temperature was 395.4° F. and the external temperature was 340° F.

FIG. 6 is a similar plot obtained during a cure check on passenger-sized tires cured for 18 minutes and post inflated. The termocouple locations in and around the tire were as follows: (1) Outside, top; (2) inside, between bladder and carcass shoulder; (3) top, between fourth ply and shoulder; (4) center top sidewall between bladder and first ply; (5) center top side between fourth ply and mold. The internal temperature was 395.4° F. and the external temperature was 340° F.

Figure 7:
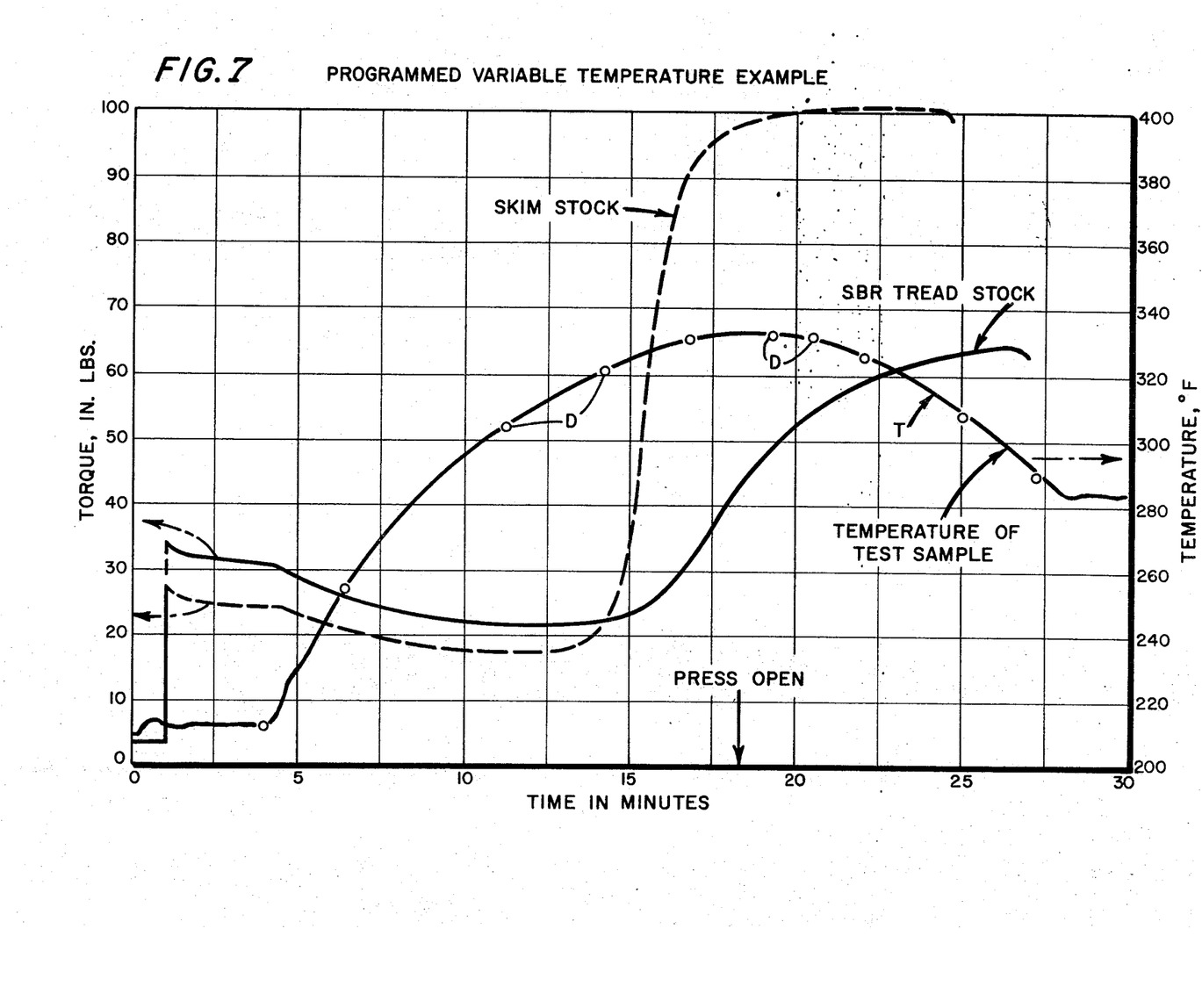
FIG. 7 is a reproduction of an actual rheometer record of data obtained using the temperature-time data recorded for thermocouple 3 in FIG. 6 to control the die temperature during the tests.

FIG. 7 is a reproduction of the experimental data obtained using the invention as described in FIG. 4 and the temperature-time data shown as Curve 3 of FIG. 6. The temperature-time data were transcribed to provide the control record 44 for the curve follower 45. This particular temperature-time record would be expected to apply to tread stock adjacent to the plys as well as the skim stock on the plys. The rheometer data for both types of stock are shown in FIG. 7. The effect of temperature on the viscosity of the stocks is demonstrated by the decrease in viscosity as the temperature increases during the experiment, prior to the scorch point of the stocks. The two different stocks exhibit quite different cure rates with the tread stock undergoing a major portion of its cure during the cooling portion of the cycle initiated when the press is opened. A record of the actual sample temperature is shown by Curve T in FIG. 7. The dots D represent points of the temperature-time curve plotted on the control card 44 on the curve follower 45. This serves to demonstrate the ability of the apparatus to follow the desired temperature program.

Figure 8:
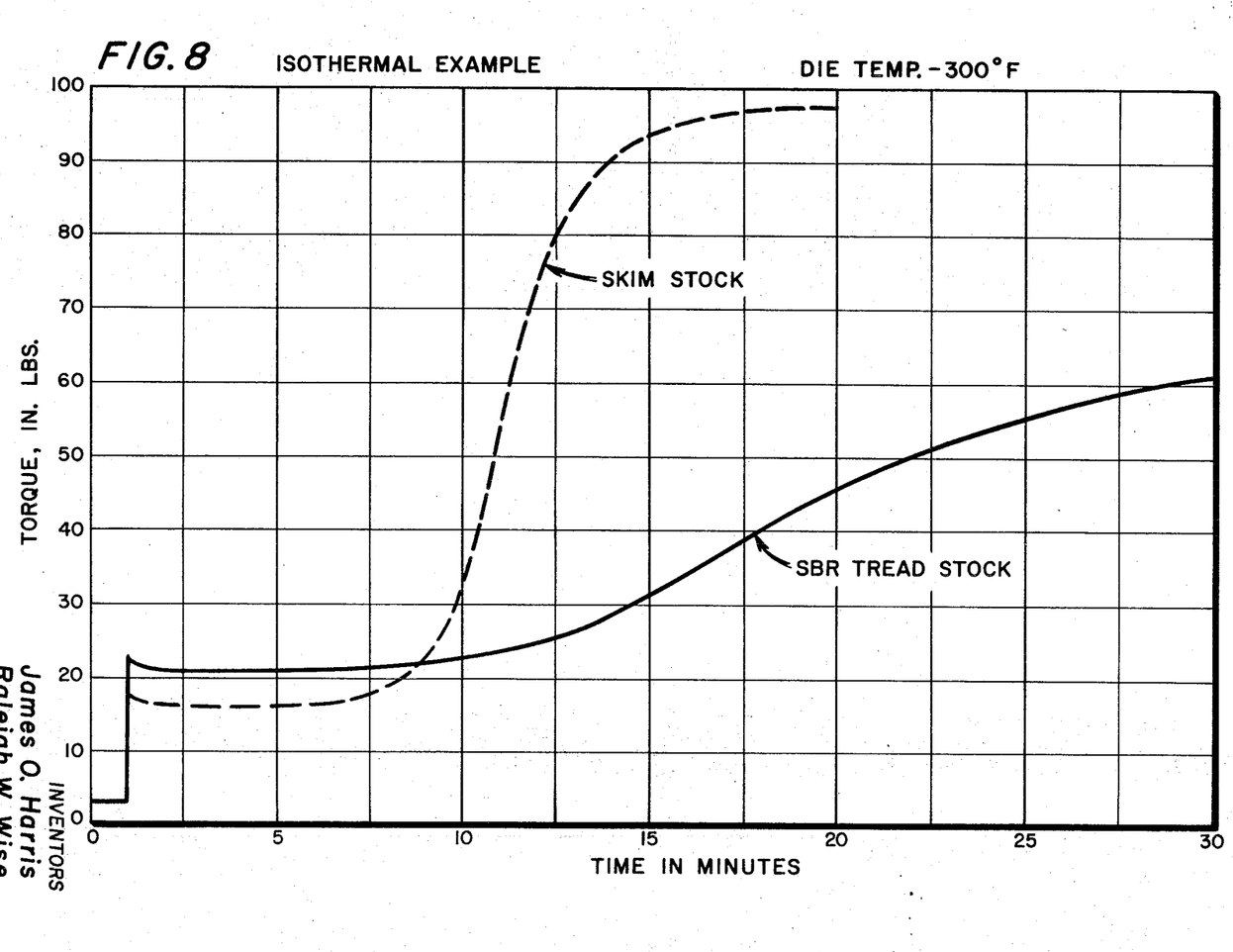
FIG. 8 is a reproduction of rheometer data obtained during isothermal tests on the same stocks used in the dynamic experiments reported in FIG. 7.

FIG. 8 is a reproduction of rheometer data for the same tread and skim stock as obtained when operating the same die and rotor system under isothermal conditions. These data, obtained at a die temperature of 300° F., when compared to the data in FIG. 7 serve to demonstrate the difficulty experienced in interpreting isothermal data and applying it to actual practice. Simple temperature-time averages do not apply to chemical reaction rates which follow exponential functions of temperature.

The material of construction of the dies should provide high heat conductivity. Thus, it is preferred that the die sections in direct contact with the rubber and with the heater be constructed of material of high heat conductivity and low heat capacity, e.g., aluminum. It is feasible to construct the dies entirely of aluminum. The die cavity may conveniently be about 1.5 inches in diameter and .140 inch in height. The rubber cross sections hereinabove referred to where a rotor is present are the sections between the top and bottom of the rotor at its periphery, respectively, and the die surfaces. With a biconical rotor the rubber will be thinner at the center than at the periphery. The sections of rubber between the periphery of the rotor and the die walls are of course, somewhat thicker, but the thickness is in part compensated by the fact that the sections are near the inside of the cavity and receives heat from the side walls as well as from the upper and lower die surfaces. It is desirable to heat the rotor, but, alternatively, the rotor may be constructed of material having poor heat conductivity, for example, titanium alloy.

The preferred method of measuring viscosity is to determine the force of subjecting the sample to rotary oscillating shear in a modified Monsanto Oscillating Disk Rheometer as herein described. The viscosity is a function of the force required to oscillate the rotor. Other instruments are available for measuring relative viscosity by force of subjecting the sample to oscillating shear, some of which do not contain a rotor, and may be used for carrying out the process of the invention. Moreover, the means for determining relative viscosity of the rubber test sample may vary and is not necessarily based upon subjecting the sample to oscillating shear. Any of the instruments for continuously measuring the viscosity of rubber during cure may be adapted to testing rubber by the process of the present invention. Various means for continuously measuring the viscosity of rubber during cure are known. Some of them are described in Continuous Measurement of the Cure Rate of Rubber, published by the American Society for Testing and Materials, 1965. The Agfa Vulcometer, the JSR Curelastomer, the Wallace-Shawberry Curometer, Cepar, the Oscillating Disk Rheometer, and the Viscurometer are examples of instruments suitable for use in the practice of the invention.

The invention provides an effective means for determining the cure time under variable temperature conditions. It eliminates the need for the cumbersome, time-consuming, imprecise determination of equivalent cure. The current practice for determining the state of cure of a section of a thick rubber article involves measuring the temeperature of that section of the article during a curing cycle to determine the temperature-time history of the rubber. The theoretical state of cure with time for such variable conditions can be predicted using the temperature coefficient of vulcanization as calculated from isothermal cure data obtained for the same compound. See Claxton and Liska, Rubber Age, 95 (1964). Complex mathematical treatment is required to integrate with respect to time the Arrhenius equation which expresses the reaction rate as a function of temperature. Special instrumentation has been reported utilizing this technique in which the temperature coefficients are combined with integrated temperature-time measurements to provide an empirical state of cure readout directly from resistance thermometer temperature measurements. See Knauerhase and Kupske, Kautschuk and Gummi, 17 129 (1964). The weighted integrals obtained in this manner are essentially a measure of the total energy input into the system. Preferably computer techniques are used to calculate the time required under the variable conditions to reach a desired state of cure. The actual state of cure desired must be predetermined relative to other desired physical properties. The cure time determined from such a mathematic treatment must provide sufficient cure to prevent the article from blowing when it is removed from the mold. Usually an additional safety-time increment is added to compensate for slow cures due to compounding and temperature variations and inaccuracy in the calculations. The accuracy of the procedure depends on the validity of the assumptions made in the calculation method and the reliability of the isothermal cure data used. The instrument described in this invention utilized the data obtained from thermocouple temperature measurements to vary the sample temperature while making direct measurements of the state of cure of the sample as a function of time. No complex mathematical computations or additional isothermal cure data are required to obtain the state of cure under variable temperature-time conditions. By the present invention the time can be read directly from the cure curve.

It is intended to cover all changes and modifications of the examples of the invention herein chosen for purposes of disclosure which do not constitute departures from the spirit and scope of the invention.

We claim:
1. Method of testing rubber which comprises determining temperature as a function of time of a section of a rubber article during cure of the article and subjecting a sample of rubber to a similar temperature-time relationship while measuring a property which is a function of the temperature-time relationship.

2. Method of claim 1 in which the property measured is the relative viscosity of the rubber.

3. Method of claim 2 wherein the composition of the sample is similar to that of the section.

4. Method of claim 2 wherein the temperature as a function of time is predetermined and a sample of rubber is subsequently subjected to the predetermined temperature-time curve.

5. Method of claim 2 in which the relative viscosity is determined by measuring the force of subjecting the sample to oscillatory shear.

6. Method of claim 2 in which the relative viscosity is determined by measuring the force of subjecting the sample to rotary oscillatory shear under pressure.

7. Method of claim 1 in which the sample of rubber is composed of two test pieces whose cross sections are not more than about 0.1 inch.

8. Method of claim 2 in which temperature as a function of time of a plurality of sections of a rubber article are determined and a sample of rubber corresponding to each section is subjected to the same temperature-time relationship.

9. Method of claim 8 in which the curing conditions for the article are selected on the basis of the testing of the sections.

10. Apparatus for testing rubber which comprises in combination: means for determining the temperature as a function of time for a section of a rubber article during cure of the article; and means for controlling the temperature of a curemeter so as to follow the said temperature-time relationship.

11. Apparatus for testing rubber which comprises in combination: a record of the temperature-time relationship of a section of a rubber article during cure; means for following the said temperature-time relationship; and means for controlling the temperature of a curemeter so as to follow the said temperature-time relationship.

12. With a curemeter for testing elastomers having a pair of separable die members defining a pressure chamber, a rotor which oscillates in the chamber, and means for measuring the force required to oscillate the rotor, the combination with means for reproducing the time temperature function of a section of an elastomer article during cure in said dies.

13. A metal die system for elastomer testing comprising a pair of die members, thermally insulted from a supporting structure, to each of which is directly attached a heater, the die members and heaters being of minimal mass, the die members forming a relatively thin rubber test pressure cavity, the die sections in contact with the rubber and heater being constructed of material of high heat conductivity, each die section being provided with means to vary the temperature rapidly and uniformly by a unique temperature-time relationship characteristic of the curing of a section of a rubber article and means for controlling the temperature varying means to reproduce within the dies the time-temperature relationship of a specific section of a rubber article during cure.

14. A metal die system of claim 13 wherein the means to vary the temperature comprises a curve follower which follows a predetermined temperature-time relationship characteristic of the curing of a section of a rubber article and temperature controllers for the dies for maintaining the temperature of the dies in accordance with said relationship.

15. A metal die system for testing rubber which comprises in combination a temperature sensor which senses the temperature of a section of a rubber article during cure and temperature controllers for the dies controlled by the sensor for maintaining the temperature of the dies in accordance with the temperature-time relationship of the section.

16. A metal die system of claim 13 in which the said material is aluminum.

17. A metal die system of claim 13 in which the die cavity contains a rotor, the combination of rotor and dies providing for rubber test sections not thicker than about 0.1 inch.

18. A metal die system of claim 17 in which the rotor is constructed of material of low heat conductivity.

19. A metal die system of claim 18 in which the material is a titanium alloy.

20. A metal die system of claim 13 provided with an air fitting and shield to circulate a cooling air stream around the dies.

References Cited
UNITED STATES PATENTS

| | | | |
|---|---|---|---|
| Re. 26,562 | 4/1969 | Beatty | 73—15.6 |
| 3,164,005 | 1/1965 | Burnell et al. | 250—202 |
| 3,397,583 | 8/1969 | Sperberg | 73—432 |

S. CLEMENT SWISHER, Assistant Examiner

U.S. Cl. X.R.

73—15.6